(12) United States Patent
Houda et al.

(10) Patent No.: US 9,841,947 B2
(45) Date of Patent: Dec. 12, 2017

(54) DEVICE AND METHOD FOR CALCULATING ABSOLUTE AMOUNT OF DISPLACEMENT, AND METHOD FOR SAME

(75) Inventors: Akihiko Houda, Ibaraki (JP); Masaharu Furuta, Ibaraki (JP)

(73) Assignee: Oriental Motor Co., Ltd., Tokyo (JP)

( * ) Notice: Subject to any disclaimer, the term of this patent is extended or adjusted under 35 U.S.C. 154(b) by 838 days.

(21) Appl. No.: 14/232,051

(22) PCT Filed: Jun. 28, 2012

(86) PCT No.: PCT/JP2012/066490
§ 371 (c)(1),
(2), (4) Date: Jan. 10, 2014

(87) PCT Pub. No.: WO2013/008634
PCT Pub. Date: Jan. 17, 2013

(65) Prior Publication Data
US 2014/0172932 A1 Jun. 19, 2014

(30) Foreign Application Priority Data

Jul. 12, 2011 (JP) ................................. 2011-153739

(51) Int. Cl.
*G06F 7/483* (2006.01)
*G01D 5/245* (2006.01)
(Continued)

(52) U.S. Cl.
CPC ............ *G06F 7/483* (2013.01); *G01D 5/2454* (2013.01); *G01D 5/2497* (2013.01); *G01D 5/34746* (2013.01)

(58) Field of Classification Search
CPC .... G06F 7/483; G01D 5/2451; G01D 5/2497; G01D 5/2452; G01D 5/34746; G01D 5/2454
See application file for complete search history.

(56) References Cited

U.S. PATENT DOCUMENTS

| | | | |
|---|---|---|---|
| 4,339,950 | A | 7/1982 | Lendino |
| 4,572,951 | A | 2/1986 | Toda |

(Continued)

FOREIGN PATENT DOCUMENTS

| | | |
|---|---|---|
| JP | 58-106691 | 6/1983 |
| JP | 59-190612 | 10/1984 |

(Continued)

OTHER PUBLICATIONS

International Search Report from corresponding Int'l App. No. PCT/JP12/66490 dated Sep. 11, 2012.
(Continued)

*Primary Examiner* — Sujoy Kundu
*Assistant Examiner* — Lynne Anderson
(74) *Attorney, Agent, or Firm* — Bryan Cave LLP

(57) ABSTRACT

Some embodiments include an absolute displacement detection device configured to calculate, from a plurality of displacement detection signals provided by a plurality of displacement detection mechanisms that detect displacement amounts, an absolute periodic signal having an absolute periodic signal period larger than displacement detection signal periods of the plurality of the displacement detection signals. Other embodiments of related devices and methods are also disclosed.

20 Claims, 9 Drawing Sheets

(51) Int. Cl.
*G01D 5/249* (2006.01)
*G01D 5/347* (2006.01)

(56) References Cited

U.S. PATENT DOCUMENTS

| | | | |
|---|---|---|---|
| 4,997,414 | A | 3/1991 | Camara |
| 5,403,245 | A | 4/1995 | Watanabe |
| 5,457,371 | A | 10/1995 | Gordon |
| 5,930,905 | A | 8/1999 | Zabler |
| 5,950,052 | A | 9/1999 | Nomura |
| 6,026,925 | A | 2/2000 | Nagao |
| 6,507,188 | B1 | 1/2003 | Dilger |
| 6,892,588 | B2 | 5/2005 | Nagase |
| 6,941,241 | B2 | 9/2005 | Lee |
| 7,040,025 | B2 | 5/2006 | Inoue |
| 7,307,415 | B2 | 12/2007 | Seger |
| 7,637,020 | B2 | 12/2009 | Maier |
| 7,775,129 | B2 | 8/2010 | Oike |
| 7,854,680 | B2 | 12/2010 | Sugai |
| 8,378,666 | B2 | 2/2013 | Putinier |
| 8,493,572 | B2 * | 7/2013 | Milvich ............ G01D 5/34715 356/614 |
| 2004/0020309 | A1 | 2/2004 | Nagase |
| 2006/0042074 | A1 | 3/2006 | Stork |
| 2008/0188346 | A1 | 8/2008 | Sugai |
| 2009/0257074 | A1 | 10/2009 | Kazama |
| 2010/0114524 | A1 | 5/2010 | Saito |
| 2010/0235054 | A1 | 9/2010 | Hoskins |
| 2013/0147469 | A1 | 6/2013 | Noda |
| 2013/0289936 | A1 | 10/2013 | Houda |
| 2014/0005976 | A1 | 1/2014 | Platzer |
| 2014/0290079 | A1 | 10/2014 | Houda |

FOREIGN PATENT DOCUMENTS

| | | |
|---|---|---|
| JP | 60-239608 | 11/1985 |
| JP | 60-239618 | 11/1985 |
| JP | 61-017913 | 1/1986 |
| JP | 63-242028 | 10/1988 |
| JP | 4-21813 | 2/1992 |
| JP | 4-212017 | 8/1992 |
| JP | 05-038243 | 2/1993 |
| JP | 2002-107178 | 4/2002 |
| JP | 2002-344110 | 12/2003 |
| JP | 2003-344110 | 12/2003 |
| JP | 2004-138606 | 5/2004 |
| JP | 3665732 | 6/2005 |
| JP | 2008-039737 | 2/2008 |
| JP | 2008-265414 | 11/2008 |
| JP | 2009-229396 | 10/2009 |
| JP | 2010-044055 | 2/2010 |

OTHER PUBLICATIONS

ISR & Written Opinion from corresponding Int'l Application No. PCT/JP2012/076093 dated Dec. 11, 2012.

ISR & Written Opinion from Int'l Application No. PCT/JP2012/050160 dated Mar. 13, 2012.

Hayashi, Y., et al., "Development of High Resolution and Compact Absolute Rotary Encoder with Batteryless Multi-turn Detecting Function," Journal of Japan Society of Precision Engineering, 2000, vol. 66, No. 8, pp. 1177-1180; for relevance, see the specification of U.S. Appl. No. 13/978,375, paragraphs [0008] and [0009] as originally amended.

* cited by examiner

| Number of Rotations of Main Shaft | Input Signals | | Computation Processing | | | | | | | |
|---|---|---|---|---|---|---|---|---|---|---|
| | p | q | a | b | c | d | e | f | g | r |
| | 5(0-4) | 9(0-8) | p*L/P | q*L/Q | a-b | mod(c,L) | mod(-d,D) | e*L | d+f | g/D |
| 0 | 0 | 0 | 0 | 0 | 0 | 0 | 0 | 0 | 0 | 0 |
| 1 | 1 | 1 | 9 | 5 | 4 | 4 | 0 | 0 | 4 | 1 |
| 2 | 2 | 2 | 18 | 10 | 8 | 8 | 0 | 0 | 8 | 2 |
| 3 | 3 | 3 | 27 | 15 | 12 | 12 | 0 | 0 | 12 | 3 |
| 4 | 4 | 4 | 36 | 20 | 16 | 16 | 0 | 0 | 16 | 4 |
| 5 | 0 | 5 | 0 | 25 | -25 | 20 | 0 | 0 | 20 | 5 |
| 6 | 1 | 6 | 9 | 30 | -21 | 24 | 0 | 0 | 24 | 6 |
| 7 | 2 | 7 | 18 | 35 | -17 | 28 | 0 | 0 | 28 | 7 |
| 8 | 3 | 8 | 27 | 40 | -13 | 32 | 0 | 0 | 32 | 8 |
| 9 | 4 | 0 | 36 | 0 | 36 | 36 | 0 | 0 | 36 | 9 |
| 10 | 0 | 1 | 0 | 5 | -5 | 40 | 0 | 0 | 40 | 10 |
| 11 | 1 | 2 | 9 | 10 | -1 | 44 | 0 | 0 | 44 | 11 |
| 12 | 2 | 3 | 18 | 15 | 3 | 3 | 1 | 45 | 48 | 12 |
| 13 | 3 | 4 | 27 | 20 | 7 | 7 | 1 | 45 | 52 | 13 |
| 14 | 4 | 5 | 36 | 25 | 11 | 11 | 1 | 45 | 56 | 14 |
| 15 | 0 | 6 | 0 | 30 | -30 | 15 | 1 | 45 | 60 | 15 |
| 16 | 1 | 7 | 9 | 35 | -26 | 19 | 1 | 45 | 64 | 16 |
| 17 | 2 | 8 | 18 | 40 | -22 | 23 | 1 | 45 | 68 | 17 |
| 18 | 3 | 0 | 27 | 0 | 27 | 27 | 1 | 45 | 72 | 18 |
| 19 | 4 | 1 | 36 | 5 | 31 | 31 | 1 | 45 | 76 | 19 |
| 20 | 0 | 2 | 0 | 10 | -10 | 35 | 1 | 45 | 80 | 20 |
| 21 | 1 | 3 | 9 | 15 | -6 | 39 | 1 | 45 | 84 | 21 |
| 22 | 2 | 4 | 18 | 20 | -2 | 43 | 1 | 45 | 88 | 22 |
| 23 | 3 | 5 | 27 | 25 | 2 | 2 | 2 | 90 | 92 | 23 |
| 24 | 4 | 6 | 36 | 30 | 6 | 6 | 2 | 90 | 96 | 24 |
| 25 | 0 | 7 | 0 | 35 | -35 | 10 | 2 | 90 | 100 | 25 |
| 26 | 1 | 8 | 9 | 40 | -31 | 14 | 2 | 90 | 104 | 26 |
| 27 | 2 | 0 | 18 | 0 | 18 | 18 | 2 | 90 | 108 | 27 |
| 28 | 3 | 1 | 27 | 5 | 22 | 22 | 2 | 90 | 112 | 28 |
| 29 | 4 | 2 | 36 | 10 | 26 | 26 | 2 | 90 | 116 | 29 |
| 30 | 0 | 3 | 0 | 15 | -15 | 30 | 2 | 90 | 120 | 30 |
| 31 | 1 | 4 | 9 | 20 | -11 | 34 | 2 | 90 | 124 | 31 |
| 32 | 2 | 5 | 18 | 25 | -7 | 38 | 2 | 90 | 128 | 32 |
| 33 | 3 | 6 | 27 | 30 | -3 | 42 | 2 | 90 | 132 | 33 |
| 34 | 4 | 7 | 36 | 35 | 1 | 1 | 3 | 135 | 136 | 34 |
| 35 | 0 | 8 | 0 | 40 | -40 | 5 | 3 | 135 | 140 | 35 |
| 36 | 1 | 0 | 9 | 0 | 9 | 9 | 3 | 135 | 144 | 36 |
| 37 | 2 | 1 | 18 | 5 | 13 | 13 | 3 | 135 | 148 | 37 |
| 38 | 3 | 2 | 27 | 10 | 17 | 17 | 3 | 135 | 152 | 38 |
| 39 | 4 | 3 | 36 | 15 | 21 | 21 | 3 | 135 | 156 | 39 |
| 40 | 0 | 4 | 0 | 20 | -20 | 25 | 3 | 135 | 160 | 40 |
| 41 | 1 | 5 | 9 | 25 | -16 | 29 | 3 | 135 | 164 | 41 |
| 42 | 2 | 6 | 18 | 30 | -12 | 33 | 3 | 135 | 168 | 42 |
| 43 | 3 | 7 | 27 | 35 | -8 | 37 | 3 | 135 | 172 | 43 |
| 44 | 4 | 8 | 36 | 40 | -4 | 41 | 3 | 135 | 176 | 44 |
| 45 | 0 | 0 | 0 | 0 | 0 | 0 | 0 | 0 | 0 | 0 |

Fig. 6

| Number of Rotations of Main Shaft | Input Signals | | Computation Processing | | | | | | | |
|---|---|---|---|---|---|---|---|---|---|---|
| | p | q | a | b | c | d | e | f | g | r |
| | 5(0-4) | 7(0-6) | p*L/P | q*L/Q | a-b | mod(c,L) | mod(d,D) | e*L | d+f | g/D |
| 0 | 0 | 0 | 0 | 0 | 0 | 0 | 0 | 0 | 0 | 0 |
| 1 | 1 | 1 | 7 | 5 | 2 | 2 | 0 | 0 | 2 | 1 |
| 2 | 2 | 2 | 14 | 10 | 4 | 4 | 0 | 0 | 4 | 2 |
| 3 | 3 | 3 | 21 | 15 | 6 | 6 | 0 | 0 | 6 | 3 |
| 4 | 4 | 4 | 28 | 20 | 8 | 8 | 0 | 0 | 8 | 4 |
| 5 | 0 | 5 | 0 | 25 | -25 | 10 | 0 | 0 | 10 | 5 |
| 6 | 1 | 6 | 7 | 30 | -23 | 12 | 0 | 0 | 12 | 6 |
| 7 | 2 | 0 | 14 | 0 | 14 | 14 | 0 | 0 | 14 | 7 |
| 8 | 3 | 1 | 21 | 5 | 16 | 16 | 0 | 0 | 16 | 8 |
| 9 | 4 | 2 | 28 | 10 | 18 | 18 | 0 | 0 | 18 | 9 |
| 10 | 0 | 3 | 0 | 15 | -15 | 20 | 0 | 0 | 20 | 10 |
| 11 | 1 | 4 | 7 | 20 | -13 | 22 | 0 | 0 | 22 | 11 |
| 12 | 2 | 5 | 14 | 25 | -11 | 24 | 0 | 0 | 24 | 12 |
| 13 | 3 | 6 | 21 | 30 | -9 | 26 | 0 | 0 | 26 | 13 |
| 14 | 4 | 0 | 28 | 0 | 28 | 28 | 0 | 0 | 28 | 14 |
| 15 | 0 | 1 | 0 | 5 | -5 | 30 | 0 | 0 | 30 | 15 |
| 16 | 1 | 2 | 7 | 10 | -3 | 32 | 0 | 0 | 32 | 16 |
| 17 | 2 | 3 | 14 | 15 | -1 | 34 | 0 | 0 | 34 | 17 |
| 18 | 3 | 4 | 21 | 20 | 1 | 1 | 1 | 35 | 36 | 18 |
| 19 | 4 | 5 | 28 | 25 | 3 | 3 | 1 | 35 | 38 | 19 |
| 20 | 0 | 6 | 0 | 30 | -30 | 5 | 1 | 35 | 40 | 20 |
| 21 | 1 | 0 | 7 | 0 | 7 | 7 | 1 | 35 | 42 | 21 |
| 22 | 2 | 1 | 14 | 5 | 9 | 9 | 1 | 35 | 44 | 22 |
| 23 | 3 | 2 | 21 | 10 | 11 | 11 | 1 | 35 | 46 | 23 |
| 24 | 4 | 3 | 28 | 15 | 13 | 13 | 1 | 35 | 48 | 24 |
| 25 | 0 | 4 | 0 | 20 | -20 | 15 | 1 | 35 | 50 | 25 |
| 26 | 1 | 5 | 7 | 25 | -18 | 17 | 1 | 35 | 52 | 26 |
| 27 | 2 | 6 | 14 | 30 | -16 | 19 | 1 | 35 | 54 | 27 |
| 28 | 3 | 0 | 21 | 0 | 21 | 21 | 1 | 35 | 56 | 28 |
| 29 | 4 | 1 | 28 | 5 | 23 | 23 | 1 | 35 | 58 | 29 |
| 30 | 0 | 2 | 0 | 10 | -10 | 25 | 1 | 35 | 60 | 30 |
| 31 | 1 | 3 | 7 | 15 | -8 | 27 | 1 | 35 | 62 | 31 |
| 32 | 2 | 4 | 14 | 20 | -6 | 29 | 1 | 35 | 64 | 32 |
| 33 | 3 | 5 | 21 | 25 | -4 | 31 | 1 | 35 | 66 | 33 |
| 34 | 4 | 6 | 28 | 30 | -2 | 33 | 1 | 35 | 68 | 34 |
| 35 | 0 | 0 | 0 | 0 | 0 | 0 | 0 | 0 | 0 | 0 |

Fig. 8

| P | Q | L | L/P | L/Q | D | mod((L,D) | Possibility of Computation |
|---|---|---|---|---|---|---|---|
| 26 | 27 | 702 | 27 | 26 | 1 | 0 | O |
| 26 | 29 | 754 | 29 | 26 | 3 | 1 | O |
| 27 | 29 | 783 | 29 | 27 | 2 | 1 | O |
| 29 | 702 | 20358 | 702 | 29 | 673 | 168 | X |
| 27 | 754 | 20358 | 754 | 27 | 727 | 2 | X |
| 26 | 783 | 20358 | 783 | 26 | 757 | 676 | X |
| 702 | 754 | 20358 | 29 | 27 | 2 | 0 | X |
| 702 | 783 | 20358 | 29 | 26 | 3 | 0 | X |
| 754 | 783 | 20358 | 27 | 26 | 1 | 0 | O |

Fig. 9

DEVICE AND METHOD FOR CALCULATING ABSOLUTE AMOUNT OF DISPLACEMENT, AND METHOD FOR SAME

CROSS-REFERENCE TO RELATED APPLICATIONS

This application is a national stage application under 35 U.S.C. 371 of and claims priority to International Patent Application No. PCT/JP2012/066490, filed on Jun. 28, 2012, which claims priority to Japanese Patent Application No. 2011-153739, filed on Jul. 12, 2011. International Patent Application No. PCT/JP2012/066490 and Japanese Patent Application No. 2011-153739 are incorporated herein by reference.

TECHNICAL FIELD OF THE INVENTION

The present invention relates to a device and method for calculating an absolute displacement amount, and more particularly relates to a device and method for calculating, from a plurality of periodic signals different in period, a periodic signal with a longer period and calculating an absolute displacement amount from the calculated periodic signal.

DESCRIPTION OF THE BACKGROUND

In the field of machine tools and the like, various schemes for detecting a displacement amount of a movable body have been examined and put in a practical use. For example, Japanese Patent No. 3967963 (Patent Literature 1) discloses a device including two resolvers that are different in absolute detection period (FIG. 1) to detect absolute displacement by using displacement detection signals outputted from the resolvers. The detecting device converts two periodic signals into data that is for acquiring a periodic signal of a least common multiple of these signals, and detects absolute displacement by using digitized stroke values prestored in a ROM.

Further, Japanese Patent No. 3665732 (Patent Literature 2) discloses a device that uses a gear mechanism including a main shaft driving gear and three driven gears engaged therewith to detect an absolute position in multi turns of the main revolving shaft (FIG. 2). The detecting device obtains the number of rotations of each driven gear based on mechanical angles detected by a resolver joined with the three driven gears, and compares the obtained number of rotations with a relation (FIG. 9) between the number of rotations of each driven gear and the number of rotations of the main rotating shaft prestored in a ROM to detect an absolute position of the main revolving shaft.

BRIEF DESCRIPTION OF DRAWINGS

FIG. 6 is a table showing a computation result in the process of calculating the periodic signal r from periodic signals p and q inputted into the period operation unit according to an embodiment.

FIG. 8 is a table showing a computation result in the process of calculating the periodic signal r from periodic signals p and q inputted into the period operation unit according to an embodiment.

FIG. 9 is a table showing the possibility/impossibility of computation in the case of computing a least common multiple from the periods of three periodic signals, and computing a periodic signal having a period of the computed least common multiple.

DETAILED DESCRIPTION OF EXAMPLES OF EMBODIMENTS

Figure 1:
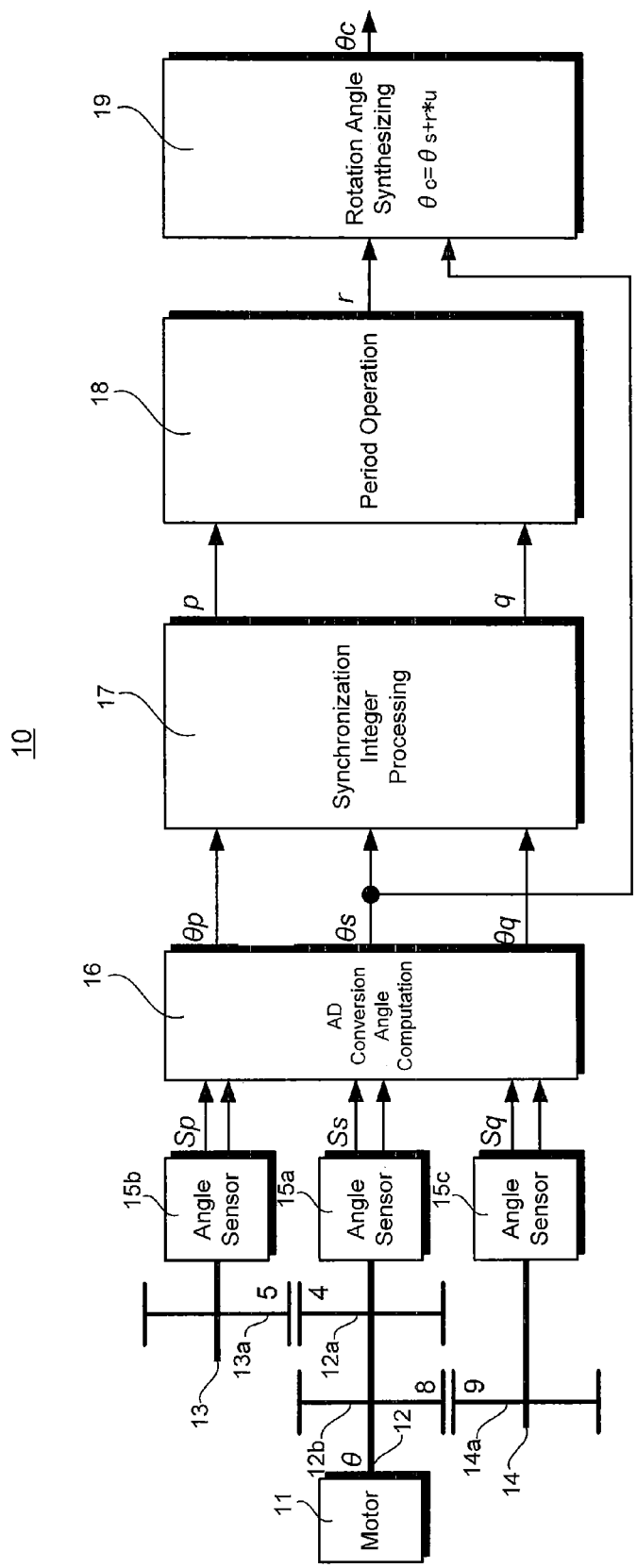
FIG. 1 is a block diagram of a multi-turn absolute rotation angle detection device, according to an embodiment.

In the invention described in Patent Literature 2, since digitized data is stored in the ROM, a semiconductor device having large memory capacity is needed and a large mounting area is taken. Because of these reasons, the cost of the detecting device becomes disadvantageously high. Moreover, in the invention described in Patent Literature 1, a two-dimensional data array necessary for acquiring from two periodic signals a periodic signal of a least common multiple of these periodic signals is converted into a one-dimensional data array so as to decrease the amount of data. However, processing is still performed with data that is prestored in the ROM.

In many embodiments, an absolute displacement detection device can solve the above-stated conventional problems. For example, the absolute displacement detection device can calculate, from a plurality of displacement detection signals detected by a plurality of displacement detection mechanisms that detect displacement amounts, an absolute periodic signal having a period larger than periods of a plurality of the displacement detection signals, without the necessity of prestoring reference data in a ROM, and a method for calculating the absolute periodic signal.

Some embodiments include an absolute displacement detection device adapted to calculate, from a plurality of displacement detection signals detected by a plurality of displacement detection mechanisms that detect displacement amounts, an absolute periodic signal having a period larger than periods of a plurality of the displacement detection signals, the absolute displacement detection device including: first computation means that generates, from a plurality of the displacement detection signals, a first periodic signal and a second periodic signal which are different in period, the first periodic signal and the second periodic signal being digitized with a common base unit amount and being changed in synchronization; second computation means that calculates a first residue by dividing a difference, between a value resulting from multiplying the first periodic signal by a first coefficient and a value resulting from multiplying the second periodic signal by a second coefficient, by a common multiple of a period of the first periodic signal and a period of the second periodic signal, the first coefficient being a value resulting from dividing the common multiple by the period of the first periodic signal, and the second coefficient being a value resulting from dividing the common multiple by the period of the second periodic signal; third computation means that calculates a second residue by dividing the first residue by a difference between the first coefficient and the second coefficient; and fourth computation means that calculates the absolute periodic signal by adding to the first residue a value resulting from multiplying the second residue by the common multiple.

In these or other embodiments, the fourth computation means may further include means that divides the absolute periodic signal by the difference between the first coefficient and the second coefficient.

In these or other embodiments, the absolute displacement detection device may further include that the common multiple is a least common multiple.

In these or other embodiments, the plurality of the displacement detection mechanisms may include a displacement sensor that detects displacement of a movable body that moves linearly.

In these or other embodiments, the plurality of the displacement detection mechanisms may include a transmission mechanism made up of a main shaft that moves rotationally, a first countershaft that receives rotation of the main shaft transmitted at a first transmission gear ratio, and a second countershaft that receives rotation of the main shaft transmitted at a second transmission gear ratio, and a plurality of the displacement detection signals may be outputted from angle sensors that detect angles of rotation of the main shaft, the first countershaft, and the second countershaft.

In these or other embodiments, the absolute displacement detection device may further include means that detect an absolute rotation angle of the main shaft by multiplying a value acquired by the dividing means by the base unit amount and further adding an angle of rotation of the main shaft thereto.

Some embodiments include a method for calculating, from a plurality of displacement detection signals detected by a plurality of displacement detection mechanisms that detect displacement amounts, an absolute periodic signal having a period larger than periods of a plurality of the displacement detection signals, the method including: a first computation step of generating, from a plurality of the displacement detection signals, a first periodic signal and a second periodic signal which are different in period, the first periodic signal and the second periodic signal being digitized with a common base unit amount and being changed in synchronization; a second computation step of calculating a first residue by dividing a difference, between a value resulting from multiplying the first periodic signal by a first coefficient and a value resulting from multiplying the second periodic signal by a second coefficient, by a common multiple of a period of the first periodic signal and a period of the second periodic signal, the first coefficient being a value resulting from dividing the common multiple by the period of the first periodic signal, and the second coefficient being a value resulting from dividing the common multiple by the period of the second periodic signal; a third computation step of calculating a second residue by dividing the first residue by a difference between the first coefficient and the second coefficient; and a fourth computation step of calculating the periodic signal by adding to the first residue a value resulting from multiplying the second residue by the common multiple.

In these or other embodiments, the fourth computation step may include a step of dividing the absolute periodic signal by the difference between the first coefficient and the second coefficient.

In these or other embodiments, the common multiple may be a least common multiple.

In these or other embodiments, a plurality of the displacement detection mechanisms may include a displacement sensor that detects displacement of a movable body that moves linearly.

In these or other embodiments, a plurality of the displacement detection mechanisms may include a transmission mechanism made up of a main shaft that moves rotationally, a first countershaft that receives rotation of the main shaft transmitted at a first transmission gear ratio, and a second countershaft that receives rotation of the main shaft transmitted at a second transmission gear ratio, and a plurality of the displacement detection signals may be outputted from angle sensors that detect angles of rotation of the main shaft, the first countershaft, and the second countershaft.

In these or other embodiments, the method may include a step of detecting an absolute rotation angle of the main shaft by multiplying a value acquired in the dividing step by the base unit amount and further adding an angle of rotation of the main shaft thereto.

Implementing the device and method for detecting the displacement amount of the rotary drive source, it becomes possible to obtain, from two periodic signals, a periodic signal of a least common multiple of these signals by easy computation without the necessity of storing referred data in the memory. Since it is not necessary to perform round robin search processing on the reference data stored in the memory, the displacement amount of the movable body can be obtained through high-speed processing. Further, the memory for prestoring the data is saved, so that cost reduction is achieved and the space allotted for the memory can be reduced.

Hereinafter, various embodiments of the device and method for detecting the displacement amount of the rotary drive source are described with reference to accompanying drawings, though the drawings and description corresponding thereto are only illustrative for implementation, and are not intended to be limited to these embodiments. Moreover, although various embodiments are capable of detecting the displacement amount of a movable body that moves linearly and the displacement amount of a movable body that moves rotationally, a description is given in the following embodiments based on the case of detecting the displacement amount (rotation angle) of a rotary drive source such as a motor. However, it should be understood that the invention defined by the scope of appended claims is not limited to the device and method for detecting the displacement amount of the rotary drive source described in the embodiments. Furthermore, it should be understood that the present invention is interpreted only in accordance with terms defined by the appended claims, and the terms are in conformity to general interpretation thereof.

FIG. 1 is a block diagram of a multi-turn absolute rotation angle calculator 10, according to an embodiment. The multi-turn absolute rotation angle calculator 10 of FIG. 1 is a device that calculates a multi-turn absolute rotation angle $\theta$ of a main shaft 12 that is joined to a rotating shaft of a motor 11 as a rotary drive source. The main shaft 12 joined to the rotating shaft of the motor 11 is equipped with a first main shaft gear 12a and a second main shaft gear 12b, which are respectively geared with a first countershaft gear 13a of a first countershaft 13 and a second countershaft gear 14a of a second countershaft 14. A transmission gear ratio of the first countershaft gear 13a to the first main shaft gear 12a is ⅘, and a transmission gear ratio of the second countershaft gear 14a to the second main shaft gear 12b is ⅚. At the transmission gear ratio of the present embodiment, the rotation speeds of the first and second countershafts 13 and 14 are decreased with respect to the main shaft 12.

The main shaft 12, the first countershaft 13, and the second countershaft 14 are equipped with angle sensors 15a, 15b, and 15c using MR elements to detect angles of rotation of the respective shafts. As long as the angle sensors 15a, 15b, and 15c are sensors to detect angles of rotation, they may be resolvers, optical encoders, or other sensors. Upon one rotation of the shafts, the angle sensors 15a, 15b, and 15c output two-phase sine wave signals (K sin θ, K cos θ) of one period. A multi-turn absolute rotation angle θc of the main shaft 12 is calculated based on two-phase sine wave signals Ss, Sp, and Sq detected by the angle sensors 15a, 15b, and 15c, the general procedures of which are as shown below. Note that the main shaft 12, the first and second countershafts 13 and 14, the first and second main shaft gears 12a and 12b, the first and second countershaft gears 13a and 14a, and the angle sensors 15a, 15b and 15c constitute a displacement detection mechanism, which outputs a plurality of displacement detection signals.

The two-phase sine wave signals of the respective shafts, detected by the angle sensors of a gearing system configured as described above, are inputted into an AD conversion/angle computation unit 16, where angle detection values θs, θp, and θq that indicate angles within one rotation of the respective rotating shafts are computed. Next, these angle detection values θs, θp, and θq are each sent to a synchronization/integer processing unit 17, where periodic signals p and q are calculated. The periodic signal p is a count of phase difference, between the main shaft angle detection value θs and the first countershaft angle detection value θp, with the amount of phase difference generated upon one rotation of the main shaft being defined as 1. The periodic signal q is a count of phase difference, between the main shaft angle detection value θs and the second countershaft angle detection value θq, with the amount of phase difference generated upon one rotation of the main shaft being defined as 1. The periodic signal p and the periodic signal q change in synchronization with the number of rotations in every rotation of the main shaft.

In the present embodiment, since the transmission gear ratio of the first main shaft gear 12a to the first countershaft gear 13a is 4/5, the first countershaft 13 rotates four times whenever the main shaft 12 rotates five times (whenever the rotation angle of the main shaft becomes an integral multiple of 360×5=1800°), by which a phase relation between the main shaft rotation angle detection value θs and the first countershaft angle detection value θp returns to an original state. More specifically, the periodic signal p has a period P (five rotations in the present embodiment). Further, since the transmission gear ratio of the second main shaft gear 12b to the second countershaft gear 14a is 8/9, the second countershaft 13 rotates eight times whenever the main shaft 12 rotates nine times (whenever the rotation angle of the main shaft becomes an integral multiple of 360×9=3240°), by which a phase relation between the main shaft rotation angle detection value θs and the second countershaft angle detection value θq returns to an original state. More specifically, the periodic signal q has a period Q (nine rotations in the present embodiment). These periodic signals p and q are further sent to a period operation unit 18 that calculates, from the periodic signals p and q, a periodic signal r indicating a period (a least common multiple L of the period P and the period Q, i.e., a period of 45 in the present embodiment) at which the angle of rotation of the first countershaft gear 13a and the angle of rotation of the second countershaft gear 14a are synchronized. Finally, the multi-turn absolute rotation angle θc of the main shaft 12 is calculated, based on the periodic signal r and the angle detection value θs, in a rotation angle synthesizing unit 19. Hereinafter, computation processing in each block is further described in detail.

The AD conversion/angle computation unit 16 converts the inputted two-phase sine wave signals Ss, Sp, and Sq into digital values, and computes arctangent (reverse tangent function) of these two signals to obtain angle detection values θs, θp, and θq of the respective shafts. Herein, if a base unit amount upper rotation is defined as, for example, 360(°), angle detection values of 0 to 360 are outputted with respect to the rotation of the shaft. Note that in the following description, the "angle" refers to display of an angle within one rotation (for example, 0 to 360(°)), and the "rotation angle" includes display of a multi-turn angle (for example, 720(°) in the case of two rotations). Note that the base unit amount u may be 1 and in that case, the rotation angle 1 refers to one rotation.

Assuming that the rotation angle of the main shaft 12 is θ, an angle detection value θs calculated from an output signal Ss of the main shaft angle sensor 15a mounted on the main shaft 12 can be obtained by computing a residue of the base unit amount u with respect to the rotation angle θ of the main shaft 12. Accordingly, the angle detection value θs may be expressed as a following expression (1). The residue refers to a remainder left when a dividend θ is divided by a divisor u in the expression (1). Further, the angle detection values θp and θq of the first and second countershafts 13 and 14 may also be obtained by computing a residue of the base unit amount u with respect to the rotation angles of the first and second countershafts 13 and 14. In consideration of allowance of the gears and detection errors of the angle sensors, and based on the transmission gear ratios of the first and second countershafts 13 and 14 to the main shaft 12 being 4/5 and 8/9, the angle detection values θp and θq may respectively be expressed as following expressions (2) and (3).

[Formula 1]

$$\theta s \approx \mathrm{mod}(\theta, u) \quad (1)$$

$$\theta p \approx \mathrm{mod}\left(\frac{4}{5}\theta, u\right) \quad (2)$$

$$\theta q \approx \mathrm{mod}\left(\frac{8}{9}\theta, u\right) \quad (3)$$

Next, a periodic signal fp of the first countershaft 13 with respect to the main shaft 12 may be obtained by computing a residue left when a difference between the angle detection value θs of the main shaft 12 and the angle detection value θp of the first countershaft 13 is divided by the base unit amount u, as expressed by a following expression (4). By multiplying the residue by a periodic number (P=5), the size of the periodic signal fp is made to match the rotation amount of the main shaft. As is clear from the expression (4), the periodic signal fp is a signal in the shape of a sawtooth wave that monotonously increases from 0 to 1800(°) with a rotation angle of the main shaft 1800° (360°×5) as one period.

[Formula 2]

$$fp = \mod(\theta s - \theta p, u) \times 5 \quad (4)$$
$$\approx \mod\left(\mod(\theta, u) - \mod\left(\frac{4}{5}\theta, u\right), u\right) \times 5$$
$$\approx \mod\left(\frac{1}{5}\theta, u\right) \times 5$$
$$\approx \mod(\theta, 5u)$$

A periodic signal fq of the second countershaft 14 with respect to their main shaft 12 may also be obtained by computing a residue left when a difference between the angle detection value θs of the main shaft 12 and the angle detection value θq of the second countershaft 14 is divided by the base unit amount u, as expressed by a following formula (5). By multiplying the residue by a periodic number (P=9), the size of the periodic signal fq is made to match the rotation amount of the main shaft. As is clear from the expression (5), the periodic signal fq is a signal in the shape of a sawtooth wave that monotonously increases from 0 to 3240(°) with a rotation angle of the main shaft 3240° (360°×9) as one period.

[Formula 3]

$$fq = \mod(\theta s - \theta q, u) \times 9 \quad (5)$$
$$\approx \mod\left(\mod(\theta, u) - \mod\left(\frac{8}{9}\theta, u\right), u\right) \times 9$$
$$\approx \mod\left(\frac{1}{9}\theta, u\right) \times 9$$
$$\approx \mod(\theta, 9u)$$

Next, the periodic signals fp and fq are divided by the base unit amount u and are made into integers in units of one rotation, so as to compute periodic signals p and q, which are representations of the periodic signals fp and fq in integers. The periodic signal fp is a signal that monotonously increases from 0 to 1800 as described in the foregoing. Accordingly, when the signal is divided by the base unit amount u (=360) and is made into an integer as a periodic signal p, the periodic signal p gains a stair-stepped waveform including four steps as shown in the upper side of FIG. 2. Similarly, the periodic signal fq is a signal that monotonously increases from 0 to 3240 as described in the foregoing. Accordingly, when the signal is divided by the base unit amount u (=360) and is made into an integer as a periodic signal q, the periodic signal q gains a stair-stepped waveform including eight steps as shown in the lower side of FIG. 2.

However, since the signals coming from each angle sensor include errors, the values of the periodic signals fp and fq are switched not at a completely synchronized timing. Accordingly, synchronization is achieved with the angle detection value θs of the main shaft, and then signal values are made into integers. In short, as shown in following expressions (6) and (7), a difference with the angle detection value θs of the main shaft is calculated, and a value obtained by dividing the difference by the base unit amount u is made into an integer. A value can be made into an integer by adding 0.5 to the value to be made into an integer and removing all decimal places from the value (INT function).

[Formula 4]

$$p = \mod\left(INT\left(\frac{fp - \theta s}{u} + 0.5\right), 5\right) \quad (6)$$

$$q = \mod\left(INT\left(\frac{fq - \theta s}{u} + 0.5\right), 5\right) \quad (7)$$

Figure 2:
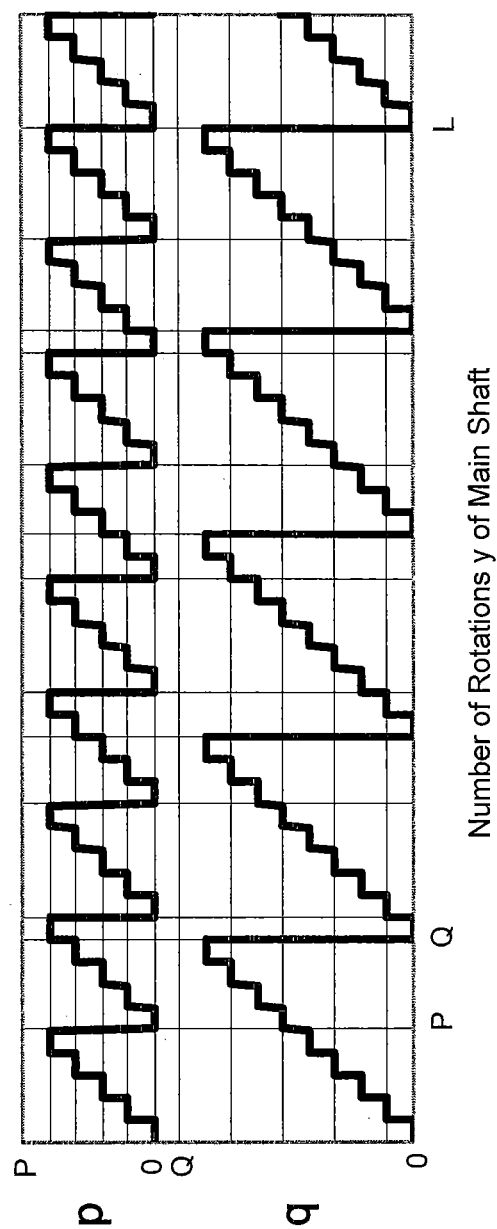
FIG. 2 is a chart showing waveforms for explaining a relationship between periodic signals p, g, and the number of rotations y of a main shaft in the multi-turn absolute rotation angle detection device, according to an embodiment.

The periodic signals p and q shown in FIG. 2 may be expressed as following expressions (8) and (9), where y designates the number of rotations of the main shaft 12:

[Formula 5]

$$p = \mod(y, P) = \mod(y, 5) \quad (8)$$

$$q = \mod(y, Q) = \mod(y, 9) \quad (9)$$

Note that, in FIG. 2, an abscissa represents the number of rotations of the main shaft 12, while an ordinate represents integral values p and q (P=5, Q=9) obtained by dividing the periodic signals fp and fq by the base unit amount u. As is understood from the periodic signals p and q shown in FIG. 2, the number of rotations of the main shaft has a period that is a least common multiple L (=45) of P (=5) and Q (=9), and no combination of the periodic signals p and q is the same within each of this period. These periodic signals p and q that have been made into integers are sent to the period operation unit 18 as shown in FIG. 1.

Figure 3:
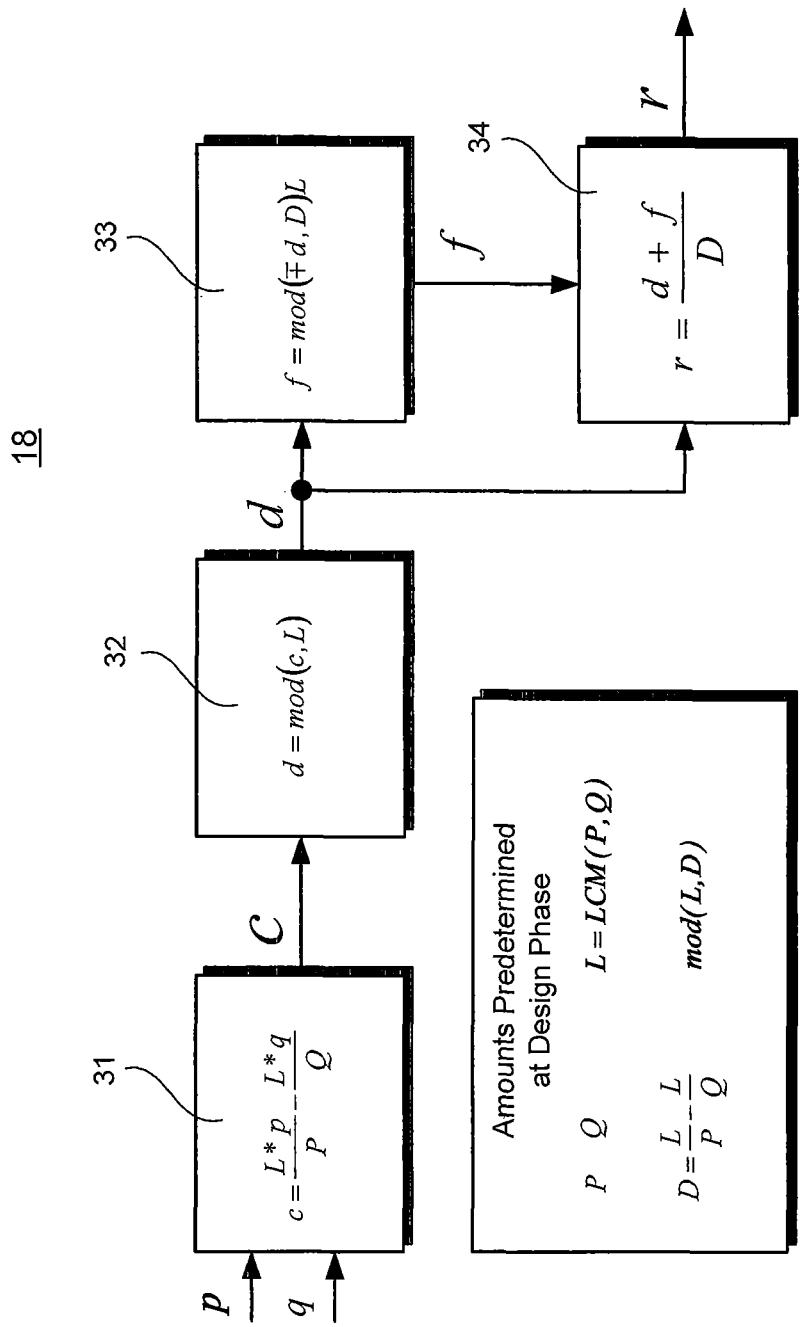
FIG. 3 is a block diagram showing a flow chart of computing a periodic signal r from the periodic signals p and q in a period operation unit.

Based on the periodic signal p having a rotation period P (=5) and the periodic signal q having a rotation period Q (=9) shown in FIG. 3, the period operation unit 18 outputs a periodic signal r having a period that is a least common multiple L (=45) of P and Q. More specifically, an absolute periodic signal g (FIG. 5) having a period of the least common multiple L of the periods P and Q of the periodic signal p and the periodic signal q shown in FIG. 2 is calculated from both of these signals. Based on a periodic signal value of the periodic signal g, the number of multi-turn rotations r of the main shaft 12 is obtained. Finally, in the rotation angle synthesizing unit 19 (FIG. 1), the angle detection value θs is added to a value obtained by multiplying the number of multi-turn rotations r by the base unit amount, to obtain a multi-turn absolute rotation angle θc of the main shaft 12.

FIG. 3 is a block diagram for explaining a flow of computing the periodic signal r from the periodic signals p and q in the period operation unit 18. Although blocks shown in FIG. 3 are illustrated as individual operation unit blocks prepared for simple explanation of computation details, this does not imply that these blocks need to be allotted to separate arithmetic elements in terms of hardware, nor implies that these blocks need to be allotted to separate modules or subroutines in terms of software.

First, prior to computation in the period operation unit 18, the following numeric values are given as amounts predetermined at a design phase. More specifically, the predetermined amounts include periods P (=5) and Q (=9) of the periodic signals p and q, a least common multiple L (=45) of the periods P and Q, and a numeric value D (=4) defined by a following expression (10) with use of the periods P and Q and the least common multiple L. The numeric value D may be defined as a value obtained by subtracting a value (second coefficient) resulting from dividing the least common multiple L by the period Q, from a value (first coefficient) resulting from dividing the least common multiple L by the period P.

[Formula 6]

$$D = \frac{L}{P} - \frac{L}{Q} \qquad (10)$$

The above-stated numeric values in parentheses are numeric values to be used in the present embodiment. These numeric values may be pre-installed as a program in the period operation unit 18, or may be inputted from the outside. It is also possible to input only the periods P and Q from the outside and to compute the least common multiple L and the numeric value D inside the unit 18.

A first computation means 31 of the period operation unit 18 receives the periodic signals p and q (FIG. 2) calculated in the synchronization/integer processing unit 17, and computes numeric values a and b from these periodic signals p and q according to following expressions (11) and (12). Then, a first numeric value c is calculated according to a following expression (13).

[Formula 7]

$$a = \frac{L \times p}{P} \qquad (11)$$

$$b = \frac{L \times q}{Q} \qquad (12)$$

$$c = a - b = \frac{L \times p}{P} - \frac{L \times q}{Q} \qquad (13)$$

Next, the first numeric value c is sent to a second computation means 32, where residue computation that computes a second numeric value d as a remainder is performed by dividing the first numeric value c by the least common multiple L as shown in a following expression (14).

[Formula 8]

$$d = \mathrm{mod}(c, L) \qquad (14)$$

Figure 4:
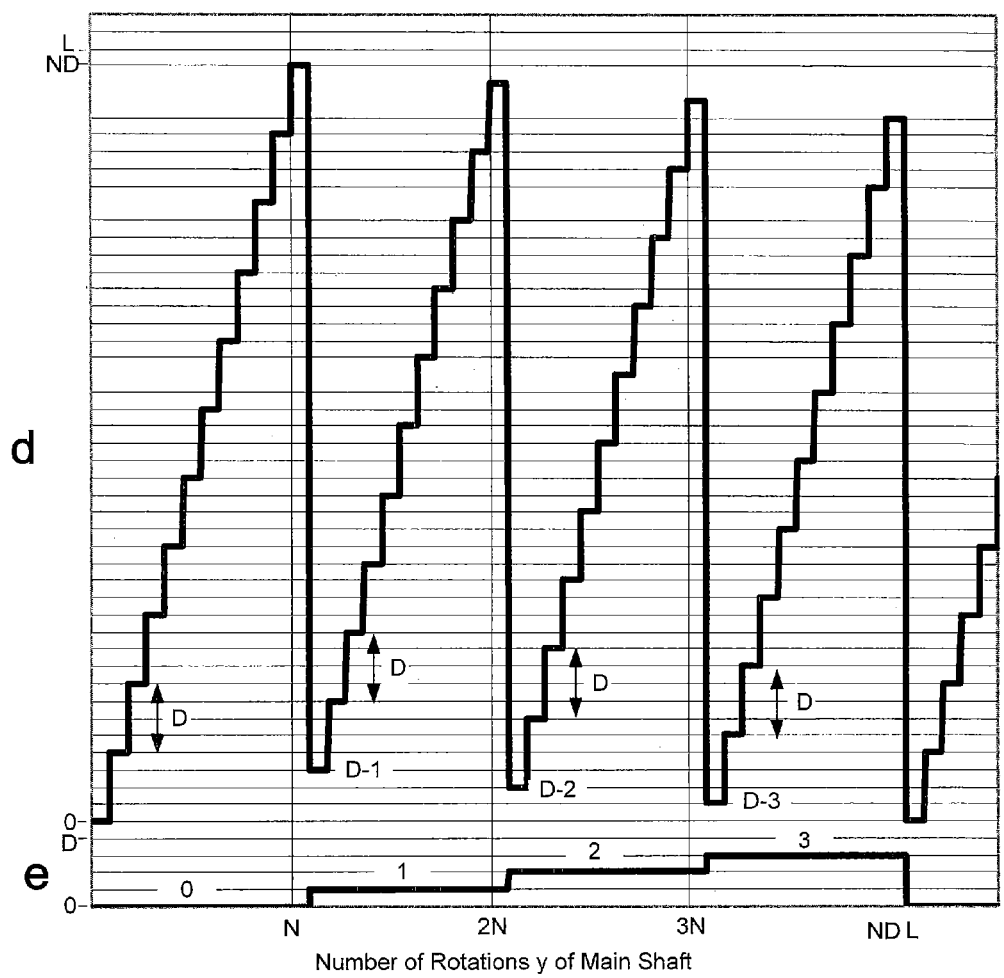
FIG. 4 is a chart showing waveforms for explaining a relationship between the number of rotations of the main shaft and numeric values d and e.

FIG. 4 shows a waveform of the second numeric value d computed according to the expression (14) with respect to the number of rotations y of the main shaft. Note that an abscissa of FIG. 4 represents the number of rotations y of the main shaft 12, while an ordinate represents the second numeric value d and a later-described third numeric value e. As is understood from FIG. 4, the second numeric value d has a stair-stepped waveform of four periods presented while the main shaft 12 rotates L times, in which one level difference represents a numeric value D. The second numeric value d is sent to a third computation means 33 and a fourth computation means 34.

Upon reception of the second numeric value d, the third computation means 33 first calculates the third numeric value e according to a following expression (15):

[Formula 9]

$$e = \mathrm{mod}(\pm d, D) \qquad (15)$$

The third numeric value e shows a stair-stepped waveform which has a period of the least common multiple L and which is made up of four steps with a level difference of 1 as shown in FIG. 3. Once the third numeric value e is calculated, the third numeric value e is multiplied by the least common multiple L to compute a fourth numeric value f as shown in a following expression (16):

[Formula 10]

$$f = e \times L \qquad (16)$$

Figure 5:
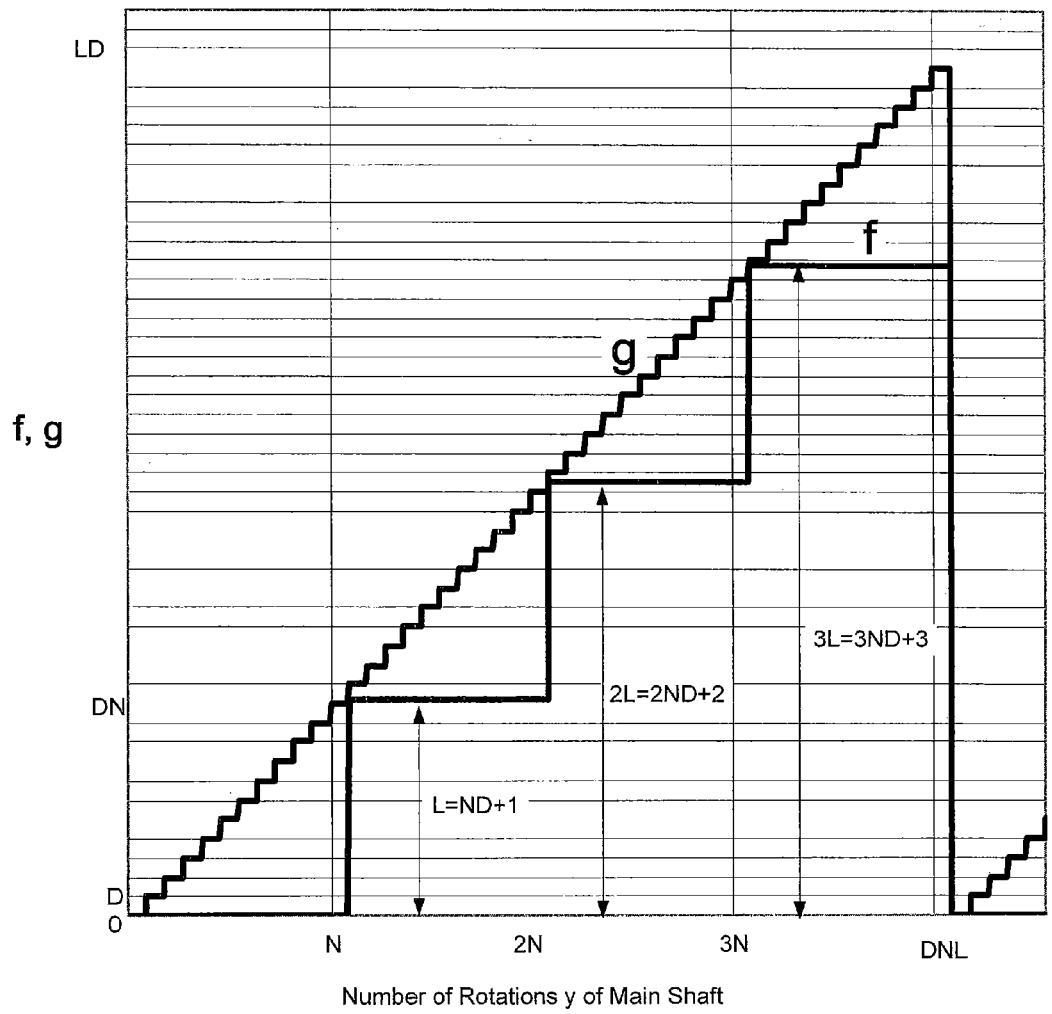
FIG. 5 is a chart showing waveforms for explaining a relationship between the number of rotations of the main shaft and numeric values f and g.

The fourth numeric value f shows a stair-stepped waveform having four steps with a level difference of the least common multiple L as shown in FIG. 5. The fourth numeric value f is sent to the fourth computation means 34.

The fourth computation means 34 first adds the second numeric value d to the fourth numeric value f to calculate a fifth numeric value g as shown in a following expression (17):

[Formula 11]

$$g = d + f \qquad (17)$$

The fifth numeric value g shows a stair-stepped waveform that monotonously increases with a step difference of D, whenever the number of rotations y of the main shaft reaches L from 0 as shown in FIG. 5. The fifth numeric value g with the stair-stepped waveform is divided by the numeric value D as shown in a following expression (18), to obtain a periodic signal r of the main shaft having a stair-stepped waveform with a level difference of 1. The periodic signal r is outputted to the rotation angle synthesizing unit 19, where a multi-turn absolute rotation angle of the main shaft is calculated.

[Formula 12]

$$r = \frac{g}{D} \qquad (18)$$

As described in the foregoing, the periodic signal r having a period of the least common multiple L of the periods P and Q of the periodic signals p and q is calculated from the periodic signals p and q by the period operation unit 18. FIG. 6 shows a computation process including an intermediate result of the above-stated computation performed upon input of the periodic signals p and q. The table shown in FIG. 6 lists the periodic signals p and q as input signals inputted into the period operation unit 18, an intermediate result of numeric values a to g, and respective values of the periodic signal r corresponding to the number of rotations of the main shaft 12. The values of the respective waveforms in FIGS. 3 to 5 correspond to the numeric values within the table shown in FIG. 6.

Now, referring to FIG. 1 again, the periodic signal r as an output of the period operation unit 18 is inputted into the rotation angle synthesizing unit 19, and the rotation angle synthesizing unit 19 calculates a multi-turn absolute rotation angle θc of the main shaft 12. Since the rotation angle θc corresponds to a value obtained by adding to the number of rotations of the main shaft 12 an angle of rotation of the main shaft, the rotation angle θc of the main shaft is obtained, as shown in a following expression (19), by adding an angle detection value θs of the main shaft that corresponds to the angle of rotation of the main shaft to the periodic signal r corresponding to the number of rotations of the main shaft (which is multiplied by the base unit amount u to have a common unit).

[Formula 13]

$$\theta c = \theta s + r \times u \qquad (19)$$

With the above computation, the multi-turn absolute rotation angle θ of the main shaft 12 is acquired by calculating the rotation angle θc according to the above expression (19).

While the periodic signal r is obtained by the expression (18), the periodic signal r of the main shaft is expressed as a following expression (20) if the numeric value g in the expression (18) is replaced with the expression (17).

[Formula 14]

$$r = \frac{g}{D} = \frac{d+f}{D} \quad (20)$$

Further, if the numeric value f in the expression (20) is replaced with the expression (16), the periodic signal r may be expressed as a following expression (21):

[Formula 15]

$$r = \frac{d+f}{D} = \frac{d+e \times L}{D} \quad (21)$$

Furthermore, if each numeric value e in the expression (21) is replaced with the expression (15), the periodic signal r may be expressed as a following expression (22):

[Formula 16]

$$r = \frac{d+e \times L}{D} = \frac{d + \mathrm{mod}(\mp d, D) \times L}{D} \quad (22)$$

Furthermore, if the numeric value d in the expression (22) is replaced with the expression (14), the periodic signal r may be expressed as a following expression (23):

[Formula 17]

$$r = \frac{\mathrm{mod}(c, L) + \mathrm{mod}(\mp \mathrm{mod}(c, L), D) \times L}{D} \quad (23)$$

Finally, if the numeric value c in the expression (23) is replaced with the expression (13), the periodic signal r may be expressed as a following expression (24):

[Formula 18]

$$r = \frac{\mathrm{mod}\left(\frac{Lp}{P} - \frac{Lq}{Q}, L\right) + \mathrm{mod}\left(\mp \mathrm{mod}\left(\frac{Lp}{P} - \frac{Lq}{Q}, L\right), D\right) \times L}{D} \quad (24)$$

As described in the foregoing, the periodic signal r may ultimately be expressed as Formula (24), and the periods P and Q, the least common multiple L, and the numeric value D in the expression (24) are given as amounts predetermined at the design phase. Accordingly, the periodic signal r may be calculated in the end by substituting the periodic signals p and q into the expression (24).

Referring to FIG. 4 again, the waveform of the numeric value d with respect to the number of rotations y of the main shaft is examined. While the numeric value d is computed according to the expression (14), the expression (13) is substituted into the numeric value c of the expression (14) and further the expressions (6) and (7) are substituted into the periodic signals p and q and are simplified, so that a following expression (25) can be obtained.

[Formula 19]

$$\begin{aligned} d &= \mathrm{mod}(c, L) \\ &= \mathrm{mod}\left(\frac{pL}{P} - \frac{qL}{Q}, L\right) \\ &= \mathrm{mod}\left(\frac{\mathrm{mod}(y, P)L}{P} - \frac{\mathrm{mod}(y, Q)L}{W}, L\right) \\ &= \mathrm{mod}\left(\mathrm{mod}\left(\frac{y}{P} - \frac{y}{Q}, L\right), L\right) \end{aligned}$$

In residue computation, since $\mathrm{mod}(\mathrm{mod}(a,b),b) = \mathrm{mod}(a,b)$ and $\mathrm{mod}(a,b) = \mathrm{mod}(ab,b)$ hold, they may be deformed into a following expression (25), where D designates a numeric value defined by the expression (10):

[Formula 20]

$$\begin{aligned} &= \mathrm{mod}\left(\left(\frac{L}{P} - \frac{L}{Q}\right)y, L\right) \quad (25) \\ &= \mathrm{mod}(Dy, L) \end{aligned}$$

Since residue computation is to obtain a remainder left when a dividend is divided by a divisor, the expression (25) may be expressed as a following expression (26) if n is an integer:

[Formula 21]

$$d = \mathrm{mod}(Dy, L) = Dy - nL \quad (26)$$

In the case where $\mathrm{mod}(L, D) = 1$ holds

In residue computation, when $\mathrm{mod}(L, D) = 1$ holds and N is an integer, L can be expressed as $L = ND+1$. If this L is substituted into the expression (26), the expression (26) may further be deformed into a following expression (27):

[Formula 22]

$$\begin{aligned} d &= Dy - nL \\ &= Dy - n(ND + 1) \\ &= D(y - nN) - n \end{aligned} \quad (27)$$

Herein, when the integer n is arranged as in the expression (26), n can also be expressed as a following formula in accordance with the definition of residue computation. INT (A) is a computation to make a numeric value A into an integer.

[Formula 23]

$$n = \mathrm{INT}\left(\frac{Dy}{L}\right)$$

If $L = ND+1$ is substituted into Formula 23, a following expression (28) is obtained.

[Formula 24]

$$n = \text{INT}\left(\frac{Dy}{ND+1}\right) \quad (28)$$

Based on the expression (27), when y=nN+1, d=D−n, and whenever y increases by 1, d increases by D.

As a result of checking the embodiment shown in FIG. 4 based on the above-stated consideration, the least common multiple L is 45 and the numeric value D is 4, so that N=11. Hereinafter, how the numeric value d changes with respect to values of the number of rotations y of the main shaft is examined.

(1) When 0≤y≤11 (=N), n=0 according to the expression (28). Consequently, a following expression is obtained:

[Formula 25]

$$d=D(y-nN)-n=Dy \quad (29)$$

Therefore, when the number of rotations y of the main shaft increases 1 at a time, the numeric value d increases 4 (=D) at a time in the range of 0 to 44 (=ND).

(2) When 12≤y≤22 (=2N), n=1, so that a following expression is obtained:

[Formula 26]

$$d=D(y-N)-n=4(y-11)-1=4(y-12)+3 \quad (30)$$

When y=12, d=3. Accordingly, when the number of rotations y of the main shaft increases 1 at a time from 12, the numeric value d increases 4 (=D) at a time in the range of 3 to 43 (=ND−1).

(3) When 23≤y≤33 (=3N), n=2, so that a following expression is obtained:

[Formula 27]

$$d=D(y-2N)-n=4(y-22)-2=4(y-23)+2 \quad (31)$$

When y=23, d=2. Accordingly, when the number of rotations y of the main shaft increases 1 at a time from 23, the numeric value d increases 4 (=D) at a time in the range of 2 to 42 (=ND−2).

(4) When 34≤y≤44 (=4N), n=3, so that a following expression is obtained:

[Formula 28]

$$d=D(y-3N)-n=4(y-33)-3=4(y-34)+1 \quad (32)$$

When y=34, d=1. Accordingly, when the number of rotations y of the main shaft increases 1 at a time from 34, the numeric value d increases 4 (=D) at a time in the range of 1 to 41 (=ND−3).

Next, e=mod(−d, D) included in the expression (15) is used as the numeric value e, and the expression (27) is substituted into the numeric value d. As a result, e=mod(−d, D) may be deformed into a following expression (33):

[Formula 29]

$$e=\text{mod}(-(D(y-nN)-n),D) \quad (33)$$

In residue computation, since mod(ab+c, b)=mod(c, b) holds, a term D (y−nN) in the expression (35) can be deleted, and therefore the expression (33) may be simplified into a following expression (34):

[Formula 30]

$$=\text{mod}(n,D)=\text{mod}(n,4) \quad (34)$$

Therefore, the numeric value e has a stair-stepped waveform indicating the values of 0, 1, 2, and 3 as shown in FIG. 4.

Once the numeric value e is obtained, the numeric value e is multiplied by the least common multiple L to calculate a numeric value f shown in FIG. 5 as shown in a following expression (35):

[Formula 31]

$$\begin{aligned} f &= e \times L \\ &= \text{mod}(n, D) \times L \end{aligned} \quad (35)$$

Next, adding the numeric value f to the numeric value d yields a numeric value g as shown in a following expression (36):

[Formula 32]

$$g=d+f=Dy-nL+\text{mod}(n,D)\times L \quad (36)$$

Since mod(n, D)=n holds with n<D, a following expression (37) holds:

[Formula 33]

$$g=Dy-nL+nL=Dy \quad (37)$$

Finally, dividing the numeric value g by the numeric value D can yield a periodic signal r of the main shaft as shown in a following expression (38):

[Formula 34]

$$r = \frac{g}{D} = \frac{Dy}{D} = y \quad (38)$$

In this expression, the number of rotations y of the main shaft is a numeric value within the range of y<L, and r=mod(y, L).

In the case where mod(L, D)=D−1 holds

In residue computation, when mod(L, D)=D−1 holds and N is an integer, L can be expressed as L=ND+D−1=(N+1)× D−1. If this L is substituted into the expression (26), the expression (26) may further be deformed into a following expression (39):

[Formula 35]

$$\begin{aligned} d &= Dy - nL \\ &= Dy - n((N+1)D - 1) \\ &= D(y - n(N+1)) + n \end{aligned} \quad (39)$$

Herein, when the integer n is arranged as in the expression (26), n can also be expressed as a following expression in accordance with the definition of residue computation.

[Formula 36]

$$n = \text{INT}\left(\frac{Dy}{L}\right)$$

If L=(N+1)×D−1 is substituted into Formula 36, Formula 36 is made into a following expression (40):

[Formula 37]

$$n = \text{INT}\left(\frac{Dy}{(N+1)D - 1}\right) \quad (40)$$

Based on the expression (39), when y=nN+1, d=n. Whenever y increases by 1, d increases by D.

Next, e=mod(d, D) included in the expression (15) is used as the numeric value e, and the expression (39) is substituted into the numeric value d. As a result, e=mod(d, D) is deformed into a following expression (41):

[Formula 38]

$$e = \text{mod}(D(y-nN+1))+n), D) \quad (41)$$

In residue computation, a term of D(y−n(N+1)) in the expression (41) can be deleted as in the case of the foregoing, and so the expression (41) may be simplified into a following expression (42):

[Formula 39]

$$= \text{mod}(n, D) \quad (42)$$

Therefore, the numeric value e has a stair-stepped waveform indicating the values of 0, 1, 2, and 3 as shown in FIG. 4.

As described above, the number of rotations y of the main shaft can be calculated by using e=mod(−d, D) when mod(L, D)=1 holds and e=mod(−d, D) when mod(L, D)=D−1 holds.

In the case where D=1 holds

When D=1, d=mod(Dy, L)=mod(y, L), and so a following expression is obtained:

[Formula 40]

$$\begin{aligned}e &= \text{mod}(\mp d, D) \\ &= \text{mod}(\mp (\text{mod}(\text{mod}(Dy, L), D) \\ &= 0\end{aligned} \quad (43)$$

The periodic signal r may be computed according to the expression (24). Now, the validity of the periodic signal r with respect to the values of the periods P and Q is examined. The expression (24) for obtaining the periodic signal r is restated as a following expression (44):

[Formula 41]

$$r = \frac{\text{mod}\left(\frac{Lp}{P} - \frac{Lq}{Q}, L\right) + \text{mod}\left(-\text{mod}\left(\frac{Lp}{P} - \frac{Lq}{Q}, L\right), D\right) \times L}{D} \quad (44)$$

According to the expressions (6) and (7), the periodic signals p and q may be expressed as following expressions (45) and 467). If these expressions are substituted into the expression (44), the periodic signal r with respect to the number of rotations y of the main shaft is expressed as a following expression (47).

[Formula 42]

$$p = \text{mod}(y, P) \quad (45)$$

$$q = \text{mod}(y, Q) \quad (46)$$

-continued $$r = \frac{\text{mod}\left(\frac{\text{mod}(y, P)L}{P} - \frac{\text{mod}(y, Q)L}{Q}, L\right) + \text{mod}\left(-\text{mod}\left(\frac{\text{mod}(y, P)L}{P} - \frac{\text{mod}(y, Q)L}{Q}, L\right), D\right) \times L}{D} \quad (47)$$

In residue computation, since mod(a, b)c=mod(ac, bc) holds, the periodic signal r is expressed as a following expression (48) if a numerator of the expression (47) is simplified:

[Formula 43]

$$r = \frac{\text{mod}\left(\text{mod}\left(\frac{Ly}{P}, L\right) - \text{mod}\left(\frac{Ly}{Q}, L\right), L\right) + \text{mod}\left(-\text{mod}\left(\frac{Ly}{P}, L\right) - \text{mod}\left(\frac{Ly}{Q}, L\right), L\right), D\right) \times L}{D} \quad (48)$$

Since mod(a, c)+mod(b, c)=mod(a+b, c) holds, the periodic signal r is expressed as a following expression (49) if the numerator of the above expression is further simplified:

[Formula 44]

$$r = \frac{\text{mod}\left(\text{mod}\left(\left(\frac{L}{P} - \frac{L}{Q}\right)y, L\right), L\right) + \text{mod}\left(-\text{mod}\left(\text{mod}\left(\left(\frac{L}{P} - \frac{L}{Q}\right)y, L\right), L\right), D\right) \times L}{D} \quad (49)$$

As shown in the expression (10), a following expression holds:

[Formula 45]

$$D = \frac{L}{P} - \frac{L}{Q}$$

Accordingly, if the above expression is substituted into the upper expression (49) and is simplified, the periodic signal r is expressed as a following expression (50):

[Formula 46]

$$r = \frac{\text{mod}(\text{mod}(D \times y, L), L) + \text{mod}(-\text{mod}(\text{mod}(D \times y, L), L), D) \times L}{D} \quad (50)$$

In residue computation, since mod(mod(a, b), b)=mod(a, b) holds, the periodic signal r is expressed as a following expression (51) if a numerator of the expression (50) is deformed:

[Formula 47]

$$r = \frac{\text{mod}(D \times y, L) + \text{mod}(-\text{mod}(D \times y, L), D) \times L}{D} \quad (51)$$

Here, if D is equal to 1 (for example, P=8, Q=9) as a condition 1, the expression (51) is turned into a following expression (52):

[Formula 48]

$$r = \frac{\mod(y, L) + \mod(-\mod(y, L), 1) \times L}{1} \quad (52)$$

In residue computation, when a is an integer, since mod(a, 1)=0 holds, the upper expression (52) becomes a following expression (53) if a term of mod(-mod(y, L),1)×L is deleted:

[Formula 49]

$$r = \mod(y, L) \quad (53)$$

Since y≤L, the periodic signal r is expressed as a following expression (54):

[Formula 50]

$$r = \mod(y, L) = y \quad (54)$$

As described in the foregoing, it was verified that the periodic signal r was equal to the number of rotations y of the main shaft when D was equal to 1 and so the number of rotations of the main shaft could be obtained by calculating the periodic signal r with use of the expression (24).

Next, the case where mod(L, D)=1 or mod(L, D)=D−1 holds as a condition 2 is examined. The expression (51) relating to the periodic signal r is restated as a following expression (55):

[Formula 51]

$$r = \frac{\mod(D \times y, L) + \mod(-\mod(D \times y, L), D) \times L}{D} \quad (55)$$

Here, if a following expression (56) is substituted into the expression (55) as shown in the expression (26), then the periodic signal r is expressed as a following expression (57):

[Formula 52]

$$\mod(Dy, L) = Dy - nL \quad (56)$$

$$r = \frac{Dy - nL + \mod(-(Dy - nL), D) \times L}{D} \quad (57)$$

When out of the above-stated conditions, mod(L, D)=1 holds, L is equal to a value obtained by adding 1 to an integral multiple of D, which can be expressed as L=ND+1. Moreover, when mod(L, D)=D−1 holds, L is equal to a value obtained by adding (D−1) to the integral multiple of D, which can be expressed as L=ND+(D−1)=(N+1)D−1. Therefore, substituting L=ND+1 and L=(N+1)D−1 into a mod term of the expression (57) yields expressions (58) and (59), respectively.

In the case where L=ND+1 is substituted

[Formula 53]

$$r = \frac{Dy - nL + \mod(-(Dy - nL), D) \times L}{D} \quad (58)$$
$$= \frac{Dy - nL + \mod(-Dy + nND + n, D) \times L}{D}$$

In the case where L=(N+1)D−1 is substituted

[Formula 54]

$$r = \frac{Dy - nL + \mod(-(Dy - nL), D) \times L}{D} \quad (59)$$
$$= \frac{Dy - nL + \mod(Dy - nND - nD + n, D) \times L}{D}$$

Since a term of the integral multiple of D in the mod term does not affect computation of the mod term, the expressions (58) and (59) are each deformed into a following expression (60) if (−Dy+nND) in the expression (58) and (Dy−nND−nD) in the expression (59) are deleted:

[Formula 55]

$$r = \frac{Dy - nL + \mod(n, D) \times L}{D} \quad (60)$$

When n in the mod term is smaller than D, mod(n, D)×L=nL holds. Therefore, the expression (60) becomes a following expression (61):

[Formula 56]

$$r = \frac{Dy - nL + nL}{D} = \frac{Dy}{D} = y \quad (61)$$

It was verified that in the case of the condition 2, the periodic signal r was equal to the number of rotations y of the main shaft as was understood from the expression (61) and so the number of rotations of the main shaft could be obtained by calculating the periodic signal r with use of the expression (24).

Figure 7:
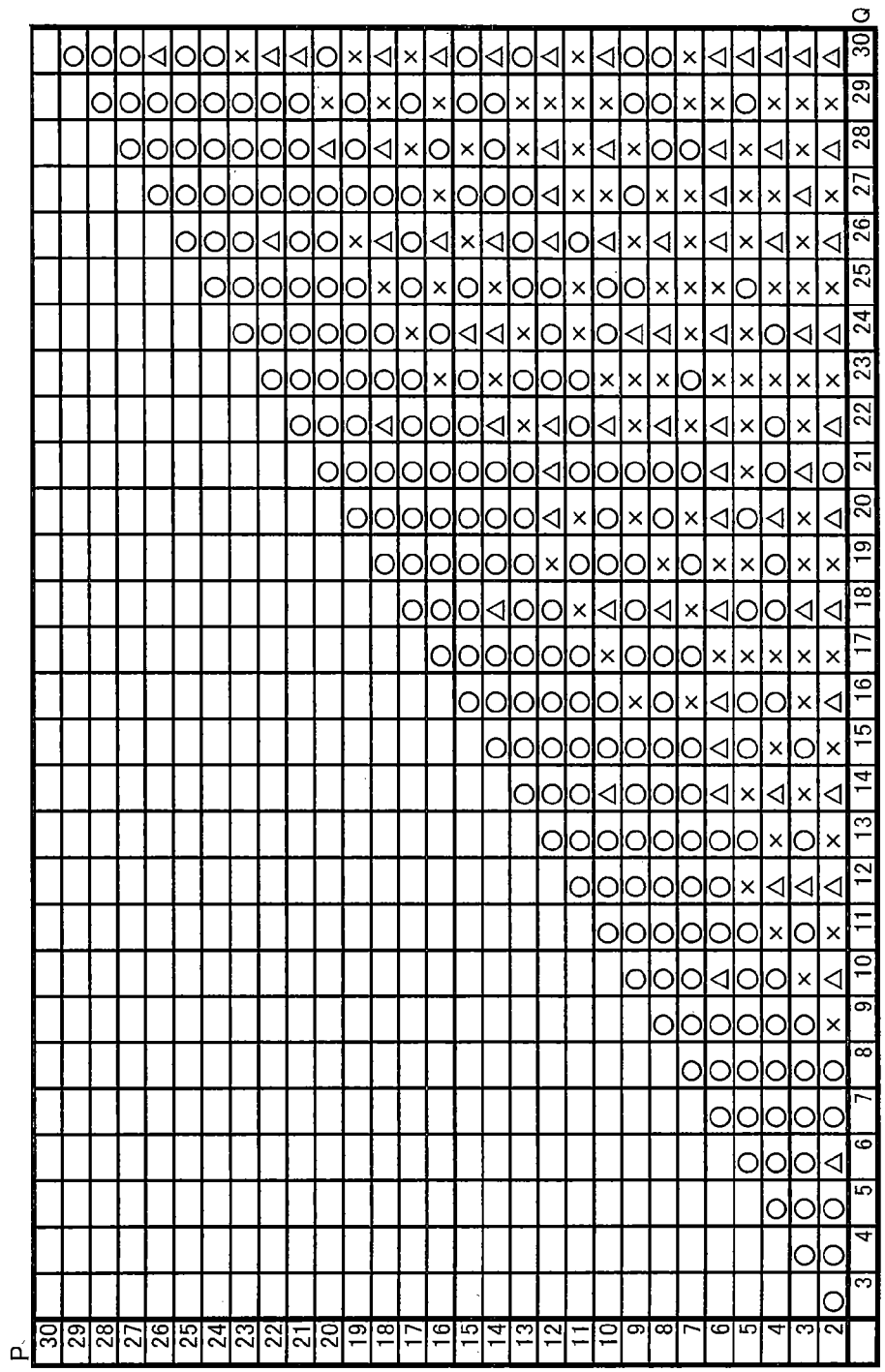
FIG. 7 shows a table showing a list of combinations of period P and Q up to 30 periods that can be processed by a computation method of according to an embodiment.

FIG. 7 shows a table showing a list of combinations of periods P and Q up to 30 periods that can be processed by the computation methods of the various embodiments described herein. In FIG. 7, an abscissa represents the period Q, while an ordinate represents each value of the period P. In the table, a circle mark represents a computable combination, a cross mark represents a combination of the periods P and Q which are mutually prime but not computable, and a delta mark represents a combination of the periods P and Q which are not mutually prime nor computable. As is understood from the table of FIG. 7, many of the periods P and Q that are mutually prime are computable. Particularly in the combinations where a difference between the periods P and Q is 3 or less, D=1, or mod(L, D)=1 and mod(L, D)=D−1 hold without a fail, which indicates that they are computable.

FIG. 8 is a table showing a computation result in the process of calculating the periodic signal r from the periodic signals p and q inputted into the period operation unit, according to an embodiment. In the present embodiment, a computation result in the case where the periods of the periodic signals p and q are P=5 and Q=7 is presented. When the periods are P=5 and Q=7, a least common multiple L of these periods is 35, and therefore it becomes possible to calculate a multi-turn absolute rotation angle with the number of rotations of the main shaft being up to 35.

In the above embodiments, a description was given of the method for computing, from the periods of two periodic signals, a periodic signal having a period of a least common multiple of these two periodic signals and obtaining a multi-turn absolute rotation angle of the main shaft. However, the method of computing is not necessarily limited to these two periodic signals, and it is also possible to compute, from the periods of three or more periodic signals, a periodic signal having a period of a least common multiple of these three or more periodic signals and to obtain a rotation angle of the main shaft. For example, as shown in FIG. 9, it is also possible to compute, from three periodic signals with 26, 27 and 29 periods, a periodic signal with a period of 20358 and to obtain a rotation angle of the main shaft (see the combination on the lowermost row in the table of FIG. 9).

However, it does not mean that any combination can be used. It is possible to select any two of the periodic signals from periodic signals with 26, 27 and 29 periods, and to compute periodic signals having the periods (L=702,754, 783) of least common multiples of these (see the combinations in each line with the circle mark on the upper rows of FIG. 9). However, it is impossible to compute a periodic signal with a period of 20358 from the periodic signal computed from any two of the periodic signals and the remaining periodic signal (see each line with the cross mark on the middle rows in FIG. 9). In this regard, it is possible to compute, from a periodic signal with a period of 754 that is computed from the periodic signal with the period of 26 and the periodic signal with the period of 29 and a periodic signal with a period of 783 that is computed from the periodic signal with the period of 27 and the periodic signal with the period of 29, a periodic signal with the period of 20358 (see the combination in the line with the round mark on the lowermost row of FIG. 9).

If periodic signals with appropriate periods are selected as described in the foregoing, it is possible to compute, from three or more periodic signals, a periodic signal having a period of a least common multiple of these signals. It should naturally be understood that a transmission mechanism formed from three or more countershafts is necessary to compute three or more periodic signals. Thus, by combining the periodic signals having wider range of periods, a periodic signal having a wider range of period can be computed and, as a result, wider range of the multi-turn absolute rotation angles can be calculated.

When P and Q are mutually prime, L=PQ, so that L/Q=P and L/P=Q. In the foregoing description, reduced numeric values are adopted as the numeric values for use in the embodiments. However, it is not necessary to limit the values to these reduced numeric values. For example, when the periods of the first and second periodic signals p and q are 6 and 8, respectively, a least common multiple of these periods L=LCM(P, Q) is equal to 24. Accordingly, computation is performed as D=L/P−L/Q=24/6−24/8=1 to calculate the rotation angle of the main shaft. However, it is also possible to perform computation not with use of the least common multiple but with common multiples, such as values of L=P×Q=48, and D=Q−P=8−6=2. In this case, a computation result twice as many as the case of computing with the least common multiple can be obtained. Therefore, by dividing an adjustment ratio by S (S=P×Q/LCM(P, Q)=48/24=2) in the middle of computation, the same result can be obtained in the end. Thus, what is important in carrying out operation of a multi-turn absolute rotation angle of the main shaft is not an absolute value of the computation result, but a ratio of the absolute value with respect to the physical quantity of a detection value from an angle sensor and the like. It is important, therefore, to adjust to have a result in conformity with the ratio with respect to the physical quantity in the end. Moreover, although the above-stated embodiments have been described based on the displacement detection mechanism that detects the displacement amount of a movable body that moves rotationally, the processing same as the processing described before is performed even when the displacement detection mechanism is replaced with a displacement detection mechanism that detects the displacement amount of a movable body that moves linearly. In that case, periodic signals with different periods are outputted from the displacement detection mechanism.

EXPLANATIONS OF REFERENCE NUMERALS

10 Multi-turn absolute rotation angle calculator
11 Rotary drive source
12 Main shaft
13, 14 Countershaft
12a, 12b First and second main shaft gears
13a, 14a First and second countershaft gears
15a, 15b, 15c Angle sensor
16 AD conversion/angle computation unit
17 Synchronization/integer processing unit
18 Period operation unit
19 Rotation angle synthesizing unit
31 to 34 First to fourth computation means
p First periodic signal made into an integer
q Second periodic signal made into an integer
P Period of first periodic signal p
Q Period of second periodic signal q
L least common multiple of period P and period Q

The invention claimed is:

1. A system for determining an absolute amount of displacement of a moving body, the system comprising:
  a displacement detection mechanism configured to detect displacement amounts, the displacement detection mechanism comprising multiple sensors configured to detect the displacement amounts and a transmission mechanism comprising a main shaft configured to move rotationally, a first countershaft configured to receive a rotation of the main shaft transmitted at a first transmission gear ratio, and a second countershaft configured to receive the rotation of the main shaft transmitted at a second transmission gear ratio; and
  an absolute displacement detection device configured to receive a plurality of displacement detections signals from the multiple sensors and configured to calculate an absolute periodic signal based on the plurality of displacement detection signals provided by the multiple sensors;
  wherein:
    the main shaft is coupled to a shaft of a rotary drive source;
    the moving body comprises the shaft of the rotary drive source;

the multiple sensors comprise:
  a first angle sensor configured to detect a first amount of displacement of the main shaft;
  a second angle sensor configured to detect a second amount of displacement of the first countershaft; and
  a third angle sensor configured to detect a third amount of displacement of the second countershaft;
the main shaft is equipped with the first angle sensor;
the first countershaft is equipped with the second angle sensor;
the second countershaft is equipped with the third angle sensor;
the displacement amounts comprise the first amount of the displacement of the main shaft, the second amount of the displacement of the first countershaft, and the third amount of the displacement of the second countershaft;
the absolute periodic signal has an absolute periodic signal period larger than displacement detection signal periods of the plurality of the displacement detection signals; and
the absolute displacement detection device comprises:
  a first computation module configured to run at one or more processors and to generate, from the plurality of the displacement detection signals, a first periodic signal having a first period and a second periodic signal having a second period different than the first period, the first periodic signal and the second periodic signal being digitized with a common base unit amount and being changed in synchronization;
  a second computation module configured to run at the one or more processors and to calculate a first residue by dividing (i) a difference between a value resulting from multiplying the first periodic signal by a first coefficient and a value resulting from multiplying the second periodic signal by a second coefficient by (ii) a common multiple of the first period and the second period, the first coefficient being a value resulting from dividing the common multiple by the first period, and the second coefficient being a value resulting from dividing the common multiple by the second period;
  a third computation module configured to run at the one or more processors and to calculate a second residue by dividing the first residue by a difference between the first coefficient and the second coefficient; and
  a fourth computation module configured to run at the one or more processors and to calculate a value resulting from adding to the first residue, a value resulting from multiplying the second residue by the common multiple.

2. The system of claim 1, wherein the multiple sensors further comprise a displacement sensor configured to detect a fourth amount of displacement of a movable body that moves linearly.

3. The system of claim 2, wherein the displacement sensor detects the fourth amount of the displacement of the movable body and provides a displacement detection signal to the absolute displacement detection device.

4. The system of claim 1, wherein the multiple sensors further comprise multiple displacement sensors configured to detect multiple amounts of displacement of multiple moving bodies that move linearly.

5. The system of claim 1, wherein the fourth computation module is further configured to calculate the absolute periodic signal by dividing (a) the value resulting from adding to the first residue, the value resulting from multiplying the second residue by the common multiple by (b) the difference between the first coefficient and the second coefficient.

6. The system of claim 5, wherein the absolute displacement detection device is further configured to determine an absolute rotation angle of the main shaft by multiplying the common base unit amount by the absolute periodic signal and further adding an angle of rotation of the main shaft thereto.

7. The system of claim 6, wherein the common multiple is a least common multiple.

8. The system of claim 6, wherein the common multiple is a least common multiple.

9. The system of claim 1, wherein the absolute displacement detection device is further configured to determine an absolute rotation angle of the main shaft by multiplying the common base unit amount by the absolute periodic signal and further adding an angle of rotation of the main shaft thereto.

10. The system of claim 1, wherein the common multiple is a least common multiple.

11. The system of claim 1, wherein:
the rotary drive source comprises a motor.

12. A method for determining an absolute amount of displacement of a moving body, the method comprising:
  calculating an absolute periodic signal based on a plurality of displacement detection signals provided by multiple sensors of a displacement detection mechanism configured to detect displacement amounts, wherein the multiple sensors are configured to detect the displacement amounts, the displacement detection mechanism further comprises a transmission mechanism comprising a main shaft transmitted at a first transmission gear ratio, and a second countershaft configured to receive the rotation of the main shaft transmitted at a second transmission gear ratio, the main shaft is coupled to a shaft of a rotary drive source, the moving body comprises the shaft of the rotary drive source, the multiple sensors comprise (i) a first angle sensor configured to detect a first amount of displacement of the main shaft, (ii) a second angle sensor configured to detect a second amount of displacement of the first countershaft, and (iii) a third angle sensor configured to detect a third amount of displacement of the second countershaft, the main shaft is equipped with the first angle sensor, the first countershaft is equipped with the second angle sensor, the second countershaft is equipped with the third angle sensor, the displacement amounts comprise the first amount of the displacement of the main shaft, the second amount of the displacement of the first countershaft, and the third amount of the displacement of the second countershaft, the absolute periodic signal has an absolute periodic signal period larger than displacement detection signal periods of the plurality of the displacement detection signals, and calculating the absolute periodic signal based on the plurality of displacement detection signals provided by the multiple sensors of the displacement detection mechanism configured to detect the displacement amounts comprises:
    generating, from the plurality of displacement detection signals, a first periodic signal having a first period and a second periodic signal having a second period different than the first period, the first periodic signal and the second periodic signal being digitized with a common base unit amount and being changed in synchronization;

calculating a first residue by dividing (i) a difference between a value resulting from multiplying the first periodic signal by a first coefficient and a value resulting from multiplying the second periodic signal by a second coefficient by (ii) a common multiple of the first period and the second period, the first coefficient being a value resulting from dividing the common multiple by the first period, and the second coefficient being a value resulting from dividing the common multiple by the second period;

calculating a second residue by dividing the first residue by a difference between the first coefficient and the second coefficient; and calculating a value resulting from adding to the first residue, a value resulting from multiplying the second residue by the common multiple.

13. The method of claim 12, further comprising detecting the displacement amount with the multiple sensors.

14. The method of claim 12, further comprising detecting, with a displacement sensor of the multiple sensors, a fourth amount of displacement of a movable body that moves linearly.

15. The method of claim 12, further comprising detecting, with multiple displacement sensors of the multiple sensors, multiple amounts of displacement of multiple moving bodies that move linearly.

16. The method of claim 12, wherein:

calculating the absolute periodic signal based on the plurality of displacement detection signals provided by the multiple sensors of the displacement detection mechanisms configured to detect the displacement amounts further comprises:

calculating the absolute periodic signal by dividing (a) the value resulting from adding to the first residue, the value resulting from multiplying the second residue by the common multiple by (b) the difference between the first coefficient and the second coefficient.

17. The method of claim 16, further comprising:

determining an absolute rotation angle of the main shaft by multiplying the common base unit amount by the absolute period signal and further adding an angle of rotation of the main shaft thereto.

18. The method of claim 16, wherein:

the rotary drive source comprises a motor.

19. The method of claim 12, wherein the common multiple is a least common multiple.

20. The method of claim 12, further comprising:

determining an absolute rotation angle of the main shaft by multiplying the common base unit amount by the absolute period signal and further adding an angle of rotation of the main shaft thereto.

* * * * *